United States Patent [19]

Friedow et al.

[11] Patent Number: 5,730,506
[45] Date of Patent: Mar. 24, 1998

[54] VIBRATION DAMPER FOR DAMPING VIBRATIONS IN A FLUID IN A SLIP-CONTROLLED HYDRAULIC BRAKE SYSTEM OF A VEHICLE SYSTEM

[75] Inventors: Michael Friedow, Tamm; Martin Maier, Moeglingen, both of Germany

[73] Assignee: Robert Bosch GmbH, Stuttgart, Germany

[21] Appl. No.: 757,882

[22] Filed: Nov. 27, 1996

[30] Foreign Application Priority Data

Nov. 28, 1995 [DE] Germany .................. 195 44 223.7

[51] Int. Cl.⁶ .................................................. B60T 17/04
[52] U.S. Cl. ........................ 303/87; 138/30; 417/385; 417/388
[58] Field of Search ................. 303/87; 137/1, 137/568, 593; 138/30, 31; 417/385, 388

[56] References Cited

U.S. PATENT DOCUMENTS

| | | | |
|---|---|---|---|
| 2,682,893 | 7/1954 | Ziebold | 138/30 |
| 5,070,983 | 12/1991 | Leigh-Monstevens et al. | 303/87 X |
| 5,205,309 | 4/1993 | Cardenas et al. | 303/87 X |
| 5,209,553 | 5/1993 | Burgdorf et al. | 303/87 X |

FOREIGN PATENT DOCUMENTS 9011212  10/1990  WIPO.

*Primary Examiner*—Robert J. Oberleitner
*Assistant Examiner*—Pamela J. Lipka
*Attorney, Agent, or Firm*—Edwin E. Greigg; Ronald E. Greigg

[57] ABSTRACT

A space-saving vibration damper that functions reliably for a long term. The vibration damper has a housing that includes at least one concave recess which is sealed by a disk-shaped diaphragm comprising a spring steel sheet. The diaphragm is connected by its edge to a planar surface of the housing by means of material-to-material bonding. The housing has, at the edge of the recess, a rounding that changes over continuously into both the recess and the planar housing surface toward the diaphragm. The hollow chamber disposed between the diaphragm and the recess is filled with air. The vibration damper is designed for use in slip-controlled hydraulic brake systems for a vehicle.

6 Claims, 1 Drawing Sheet

VIBRATION DAMPER FOR DAMPING VIBRATIONS IN A FLUID IN A SLIP-CONTROLLED HYDRAULIC BRAKE SYSTEM OF A VEHICLE SYSTEM

BACKGROUND OF THE INVENTION

The invention is based on a vibration damper for damping vibrations in a fluid in a slip-controlled hydraulic brake system of a vehicle.

A vibration damper of this type that has a relatively thick-walled, elastomer diaphragm which is clamped at its edge inside a housing is already known (WO 90/11212). On its one side, the diaphragm is exposed to the fluid of a brake system, which is subjected to vibrations. With its other side, the diaphragm defines an air-filled, hollow chamber formed by a concave recess of a housing wall that extends around the diaphragm.

The known vibration damper requires a relatively large amount of space. Moreover, the hollow chamber is not permanently tight, because the housing wall only engages the diaphragm in frictional contact, which, after long-term stress, can cause damage to the runout of the recess that forms an edge.

OBJECT AND SUMMARY OF THE INVENTION

In contrast, the vibration damper of the invention has the advantage that the diaphragm requires less space, is connected to the housing in a hermetically tight manner, and, because of a rounding of the edge of the recess, is subjected to less material stresses than in an angular limiting of the recess.

Advantageous refinements of and improvements to the vibration damper disclosed are possible with the measures outlined hereinafter.

The embodiment of the invention has the advantage that a relatively large compression volume can be made available under pressure loads, and expansion volumes can be made available under negative-pressure loads, without overloading the diaphragm. Thus, during maximum stress, the diaphragms are supported against one another in the plane of the opening between the two recesses, thereby limiting their elastic deformation.

Cost advantages over a housing produced using metal-cutting can be achieved with the measures disclosed hereinafter.

Welding the diaphragm to the housing assures a permanent, tight connection between the diaphragm and the housing.

Forming the diaphragm with a step or concentrically corrugated offers a simple way of influencing the characteristic of the vibration damper, and keeping the material stresses in the diaphragm low during deformation.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
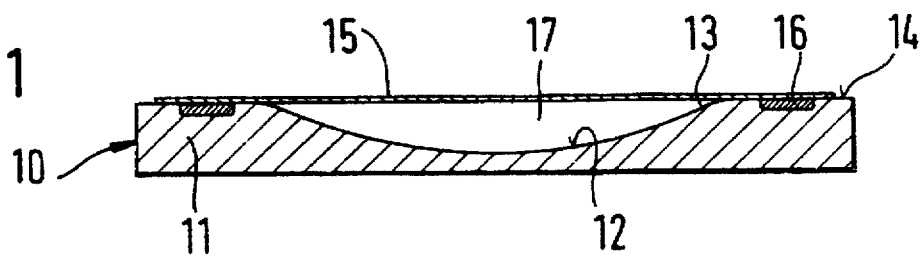
FIG. 1 shows a section through a first exemplary embodiment of a vibration damper having one diaphragm.

A vibration damper 10 shown as a first exemplary embodiment in FIG. 1 has a circular-disk-shaped, press-formed steel housing 11. The housing 11, which has a low height, is provided with a concave recess 12. The recess 12 has at its surrounding edge a rounding 13, so it changes over continuously into a planar housing surface 14 of the vibration damper 10. A circular-disk-shaped diaphragm 15 comprising a spring steel sheet rests against the housing surface 14, coaxial with the recess 12. Outside of the rounding 13, the diaphragm 15 is connected along its edge to the housing 11 by an encompassing welded connection 16, that is, by material-to-material bonding. A hermetically-sealed, air-filled, hollow chamber 17 which is under atmospheric pressure is formed in the recess 12 between the diaphragm 15 and the housing 11.

The vibration damper 10 is designed for use in a hydraulic, slip-controlled vehicle brake system, as described in published German patent application DE 43 36 464 A1. The vibration damper 10 is to be disposed in a line connection between a main brake cylinder having a reservoir container for brake fluid, on one side, and the aspiration side of a self-priming reciprocating piston pump and at least one wheel-brake cylinder on the other. The diaphragm 15 therefore comes into contact with brake fluid on the side remote from the hollow chamber.

The diaphragm 15 of the vibration damper 10 can be moved into and away from the recess 12 from its illustrated, central position. When pressure is exerted by an elastic deformation of the diaphragm 15 into the recess 12, the vibration damper 10 makes a compression volume available. When negative pressure is exerted, in which the volume of the hollow chamber 17 is increased by a corresponding elastic deformation of the diaphragm 15, the damper makes an expansion volume available. The vibration damper 10 is therefore capable of avoiding longitudinal vibrations that occur in brake fluid in the aforementioned line connection, as well as vibrational cavitation occurring due to the function of the pulsating-feed pump, so that the pump can pump a sufficiently large volume flow of brake fluid for rapid pressure buildup in the wheel-brake cylinder, for example during traction or drive-slip control. Furthermore, the vibration damper 10 is capable of reducing pressure shocks occurring in the line connection to the main cylinder when traction control operation ends.

Figure 2:
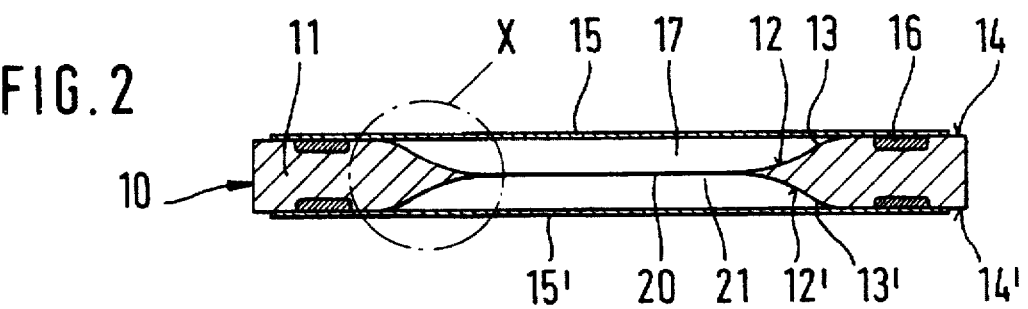
FIG. 2 shows a section through a second exemplary embodiment of a vibration damper, in which a diaphragm is disposed on each side of the housing.
Figure 3:
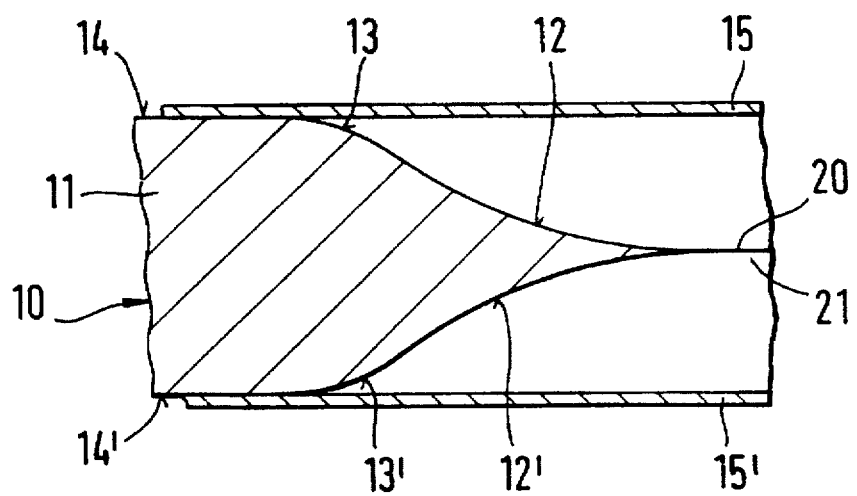
FIG. 3 shows an enlarged representation of a detail X from FIG. 2, and FIGS. 4 and 5 show profiles of different diaphragms shown in semi-section, again on an enlarged scale.

In the second exemplary embodiment of a vibration damper 10, shown in FIG. 2, the press-formed housing 11 is provided with two concave recesses 12 and 12', which extend from two housing surfaces 14 and 14' remote from one another. Because the height of the housing 11 is less than twice the depth of the recess, the two recesses 12 and 12' merge in the center of the housing, forming an edge 20. In other words, the two recesses 12 and 12' intersect to form a common opening 21 that joins the hollow chamber 17 associated with each recess to form a single chamber. FIG. 3 shows an enlarged representation of the transition between the two recesses 12 and 12' at the edge 20. In a deviation from the exemplary embodiment, the edge can be rounded in a work cycle that follows the press forming. The concave embodiment of the recesses 12 and 12' and the roundings 13 and 13', respectively, toward the housing surface 14 or 14' that is associated with each recess can also be seen in the enlarged representation. Also as a deviation from the previous exemplary embodiment, the vibration damper 10 according to FIG. 2 is covered on both sides by congruent diaphragms 15 and 15'. These diaphragms are likewise tightly connected to the housing 11 by means of welding or any other suitable means.

The vibration damper 10 according to FIG. 2 is to be disposed in the aforementioned brake system in the same manner as the vibration damper according to FIG. 1, with the exception that the outside of the two diaphragms 15 and 15' is exposed to the brake fluid. The function of the vibration dampers 10 is otherwise the same. With the external dimensions of the vibration damper 10 being otherwise identical in the two exemplary embodiments, the vibration damper according to FIG. 2 makes a larger expansion or compression volume available. The vibration damper 10 according to FIG. 2 therefore has a different damping characteristic from the damper according to FIG. 1.

Figure 4:
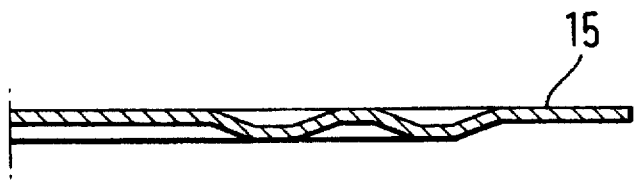
Figure 5:
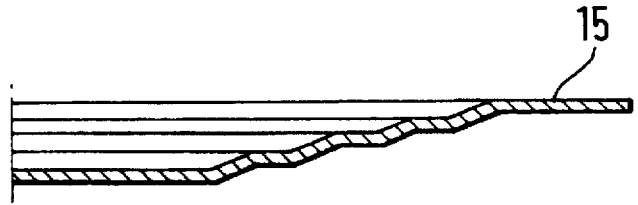

In contrast to the two exemplary embodiments of the vibration damper 10 according to FIGS. 1 and 2, in which the diaphragm 15 or 15' is completely planar in the normal state, diaphragms can also be used whose active surface is profiled. FIG. 4 shows a diaphragm 15 that has a concentrically corrugated profile. In FIG. 5, in contrast, a diaphragm 15 is shown that has a concentrically stepped profile. In comparison to a planar diaphragm, this embodiment permits a greater stroke and less material stress. A different characteristic of the vibration damper 10 can also be attained with this measure.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A vibration damper (10) for damping vibrations in brake fluid in a hydraulic slip-controlled vehicle brake system, having the following features:

at least one disk-shaped diaphragm (15), the at least one diaphragm (15) is secured by an edge to a surface of a housing (11), the housing (11) has a concave recess (12) on a side of the diaphragm which forms a hollow chamber (17), the hollow chamber (17) is disposed between the diaphragm (15) and the recess (12) of the housing (11) and is filled with air, the diaphragm (15) is formed by a spring steel sheet, and is connected by an edge to a surface of the housing (11) by means of a material-to-material bonding, and the housing (11) has, at an edge of the recess (12), a rounding (13) that makes a continuous transition to the recess and to a housing surface (14) on one side of the diaphragm, and said diaphragm is directly subjected to brake fluid on a side opposite from said hollow chamber (17).

2. A vibration damper as defined in claim 1, in which the housing (11) is a press-formed part.

3. A vibration damper as defined in claim 1, in which the at least one diaphragm (15) is welded to a planar surface of said housing (11).

4. A vibration damper as defined in claim 1, in which the diaphragm (15) is concentrically corrugated or stepped.

5. A vibration damper (10) for damping vibrations in fluid in a hydraulic slip-controlled vehicle brake system, having the following features:

first and second disk-shaped diaphragms (15, 15'), said first diaphragm (15) is secured by an edge to the first side of said housing (11), said second diaphragm is secured by an edge to said second side of said housing, said concave surfaces merge to form recesses (12 and 12'), a hollow chamber (17) is disposed between the first and second diaphragms (15, 15') and the recesses (12 and 12') of the housing (11) and is filled with air, first and second diaphragms (15 and 15') are formed by a spring steel sheet, and is connected by their edge to the housing (11) by means of a material-to-material bonding, and the housing (11) has, at an edge of the recesses (12, and 12'), a rounding (13 and 13') that makes a continuous transition to the recesses (12 and 12') and to a housing surface (14 and 14') on side of each of said first and second diaphragms.

6. A vibration damper as defined in claim 5, in which the housing (11) is a press-formed part.

* * * * *